United States Patent
Park et al.

(10) Patent No.: US 8,164,696 B2
(45) Date of Patent: Apr. 24, 2012

(54) APPARATUS AND METHOD OF DISPLAYING AN IMAGE

(75) Inventors: Jae-Hong Park, Gangneung-si (KR); Oh-Jeong Kwon, Suwon-si (KR); Hong-Jo Park, Suwon-si (KR); Hyeok-Jin Lee, Seongnam-si (KR); Sung-Jae Yun, Yongin-si (KR); Hee-Seop Kim, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 279 days.

(21) Appl. No.: 12/572,214

(22) Filed: Oct. 1, 2009

(65) Prior Publication Data

US 2010/0157177 A1   Jun. 24, 2010

(30) Foreign Application Priority Data

Dec. 19, 2008   (KR) .................. 10-2008-0129762

(51) Int. Cl.
*G02F 1/1335* (2006.01)
*G02B 27/26* (2006.01)

(52) U.S. Cl. ............... 349/15; 349/96; 349/98; 359/465

(58) Field of Classification Search ............. 349/96, 349/97, 98, 87, 76, 168, 170, 172, 179, 181, 349/187, 192, 15; 359/465
See application file for complete search history.

(56) References Cited

U.S. PATENT DOCUMENTS

| 7,327,433 | B2 * | 2/2008 | Miyachi et al. ............... 349/169 |
| 2005/0174317 | A1 | 8/2005 | Izumi et al. | |
| 2005/0185131 | A1 * | 8/2005 | Miyachi et al. ............... 349/167 |
| 2006/0203169 | A1 | 9/2006 | Ozawa et al. | |
| 2008/0100764 | A1 | 5/2008 | Haruyama | |
| 2010/0157177 | A1 * | 6/2010 | Park et al. ........................ 349/15 |

FOREIGN PATENT DOCUMENTS

JP   2008241789 A   10/2008

OTHER PUBLICATIONS

European International Search Report dated Jan. 13, 2010 (6 pages).

* cited by examiner

*Primary Examiner* — Brian Healy
(74) *Attorney, Agent, or Firm* — Innovation Counsel LLP

(57) ABSTRACT

A display apparatus includes a display panel, a first polarization part, and a second polarization part. The display panel includes an array substrate, an opposite substrate and an electro-optical material layer disposed between the array substrate and the opposite substrate. The electro-optical material layer reflects first circularly polarized light having a wavelength of a predetermined range and transmits second circularly polarized light having a phase difference with the first circularly polarized light. The first polarization part faces a rear face of the array substrate and converts incident light of the rear face into the first circularly polarized light. The second polarization part faces a front face of the opposite substrate and blocks the first circularly polarized light reflected from the electro-optical material layer and transmits the second circularly polarized light transmitted through the electro-optical material layer.

20 Claims, 18 Drawing Sheets

LINEAR POLARZATION

CIRCULAR POLARIZITION

APPARATUS AND METHOD OF DISPLAYING AN IMAGE

PRIORITY STATEMENT

This application claims priority under 35 U.S.C. §119 to Korean Patent Application No. 2008-129762, filed on Dec. 19, 2008 in the Korean Intellectual Property Office (KIPO), the contents of which are herein incorporated by reference in their entirety.

BACKGROUND

1. Field of the Invention

Example embodiments of the present invention relate to an apparatus and a method of displaying an image. More particularly, example embodiments of the present invention relate to an apparatus and a method of displaying an image capable of improving display quality.

2. Description of the Related Art

Generally, when compared to a cathode ray tube (CRT), a liquid crystal display (LCD) device is slimmer, lighter, consumes less power, and is more widely used. The LCD device includes a liquid crystal panel and polarization plates respectively disposed at a rear face and a front face of the liquid crystal panel. The liquid crystal panel may include an alignment film for maintaining an initial direction of a liquid crystal and electrodes for applying an electric field to a liquid crystal layer. Studies for achieving simplification of a process, a fast response time, a wide viewing angle, a simple structure of a device and so on have been conducted relating to the LCD device.

The alignment film in the LCD device requires many processes such as a spreading process, a rubbing process, a light alignment process, etc., that complicate the manufacturing processes. The side visibility of the LCD device is inferior to that of the CRT, and thus a variable driving method such as a patterned vertical alignment (PVA) mode or an in-plane switching (IPS) mode for enhancing the weaknesses of the LCD device are used. However, to date, the PVA mode or the IPS mode have been insufficient to solve the side visibility weaknesses of the LCD device. The response time of the liquid crystal may not be sufficiently fast in a device, such as a television, to embody a moving image, resulting a problem in that image quality may not be enhanced.

SUMMARY

Example embodiments of the present invention provide a method of displaying an image capable of improving display quality.

Example embodiments of the present invention also provide a display apparatus for performing the above-mentioned method.

In one aspect of the present invention, there is provided a method of displaying an image. In the method, first light is converted into second light by circularly polarizing the first light. A black state is displayed by orthogonally polarizing the second light with respect to a first direction in which the first light is polarized. The second light is light passing an electro-optical material layer having a chirality in which circularly polarized light having a wavelength of a predetermined range is reflected and having optical isotropy when an electric field is off. A white state is displayed by orthogonally polarizing third light with respect to the first direction. The third light is formed by passing the second light through the electro-optical material layer having optical anisotropy when an electric field is applied to the electro-optical material layer.

In one embodiment, the electro-optical material layer may include blue-phase liquid crystal displaying the black state when the electric field is not applied thereto to be the optical isotropy and displaying the white state when the electric field is applied thereto to induce the optical anisotropy having birefringence characteristics.

In one embodiment, the first light may be left-handed circularly polarized to be converted into the second light, the blue-phase liquid crystal may include a left-handed liquid crystal reflecting a portion of the second light, and a remainder of the second light transmitted through the blue-phase liquid crystal may be right-handed circularly polarized at the black state so that the second light is blocked. In converting into the second light, the first light that is a non-polarized light may be linearly polarized and the linearly polarized first light may be left-handed circularly polarized by varying a phase of the linearly polarized first light by $\lambda/4$. In displaying the white state, a phase of the third light may be varied by $\lambda/4$ to polarize the third light, the third light having the varied phase may be orthogonally polarized based on a linear polarized direction of the first light and the orthogonally polarized third light may be outputted. The third light may be formed by passing the second light through the blue-phase liquid crystal receiving the electric field and the second light may be left-handed circularly polarized light.

In one embodiment, in displaying the black state, fourth light may be circularly polarized in an opposite direction of a polarizing direction of the second light to convert into fifth light and a reflected light of the fifth light may be orthogonally polarized with respect to the first light polarized direction to block the reflected light. The fourth light may be incident into the electro-optical material layer in an opposite direction of the second light and the reflected light may be generated by reflecting the fifth light to the electro-optical material layer.

In one embodiment, a horizontal electric field may be applied to the blue-phase liquid crystal an in-plane switching (IPS) method.

According to another aspect of the present invention, a display apparatus includes a display panel, a first polarization part, and a second polarization part. The display panel includes an array substrate, an opposite substrate, and an electro-optical material layer disposed between the array substrate and the opposite substrate. The array substrate and the opposite substrate are opposite to each other. The electro-optical material layer reflects first circularly polarized light having a wavelength of a predetermined range and transmits second circularly polarized light having a phase difference with the first circularly polarized light. The first circularly polarized light and second circularly polarized light are incident light from the exterior. The first polarization part faces a rear face of the array substrate and converts incident light of the rear face into the first circularly polarized light. The second polarization part faces a front face of the opposite substrate and blocks the first circularly polarized light reflected from the electro-optical material layer and transmits the second circularly polarized light through the electro-optical material layer.

In one embodiment, the electro-optical material layer may use blue-phase liquid crystal displaying the black state when the electric field is off by having optical isotropy and displaying the white state when the electric field is applied to the electro-optical material layer by being inducted optical anisotropy having birefringence characteristics. The second polarization part may convert incident light of the front face into a third circularly polarized light having a polarization direction equal to a polarization direction of the second circularly polarized light. The blue-phase liquid crystal may include nematic liquid crystal, a chiral dopant giving a chirality to the nematic liquid crystal, and a polymer strengthening phase stability of the blue-phase liquid crystal. The polymer may be hardened by ultraviolet rays.

In one embodiment, the first polarization part may include a first linear polarization and a first λ/4 polarization plate. The first plate polarization part may linearly polarize a non-polarized incident light of the rear face and the first λ/4 polarization plate may be disposed between the array substrate and the first linear polarization plate. The second polarization part may include a second linear polarization plate and a second λ/4 polarization plate. The second polarization part may be disposed orthogonally with the first linear polarization plate and the second λ/4 polarization plate may be disposed between the opposite substrate and the second linear polarization plate. A polarization axis of the second λ/4 polarization plate may be orthogonal to the first λ/4 polarization plate.

In one embodiment, the first polarization part may left-handed circularly polarize incident light of the rear face, the blue-phase liquid crystal may include left-handed chirality liquid crystal reflecting a portion of the left-handed circularly polarized light and the second polarization part may linearly polarize right-handed circularly polarized light transmitted through the blue-phase liquid crystal. The first polarization part may right-handed circularly polarize incident light of the rear face, the blue-phase liquid crystal may include a right-handed chirality liquid crystal reflecting a portion of the right-handed circularly polarized light and the second polarization part may linearly polarize left-handed circularly polarized light transmitted through the blue-phase liquid crystal.

In one embodiment, the array substrate may include a lower substrate having formed thereon a signal line, a switching element electrically connected to the signal line, a pixel electrode electrically connected to a drain electrode of the switching element, and a common electrode forming a horizontal electric field with the pixel electrode by an in-plane switching (IPS) method. The common electrode may be formed adjacent to the pixel electrode. The opposite substrate may include an upper substrate facing the lower substrate, color filters formed on the upper substrate corresponding to the pixel electrode and a light-blocking part formed between the color filters to shield the signal line and the switching element.

According to the present invention, an image is displayed by using blue-phase liquid crystal, so that a manufacturing process of the display apparatus may be simplified. Moreover, the response time of a display apparatus and a viewing angle may be enhanced, so that display quality may be improved. Furthermore, a bluish phenomenon of blue-phase liquid crystal may be prevented, so that a contrast ratio may be increased. Furthermore, color reproducibility in accordance with a grayscale may be enhanced, so that display quality may be enhanced.

BRIEF DESCRIPTION OF THE DRAWINGS

The above and other features of the present invention will become more apparent by describing in detailed example embodiments thereof with reference to the accompanying drawings, in which.

DETAILED DESCRIPTION

Figure 1:
FIG. 1 is a cross-sectional view illustrating a display apparatus according to an example embodiment of the present invention.

The present invention is described more fully hereinafter with reference to example embodiments shown in the accompanying drawings. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a cross-sectional view illustrating a display apparatus according to an example embodiment of the present invention.

Referring to FIG. 1, the display apparatus 5 includes a display panel 10, a first polarization part 30 and a second polarization part 50.

The display panel 10 includes array substrate 101 an opposite substrate 201 facing the array substrate 101 and an electro-optical material layer disposed between the array substrate 101 and the opposite substrate 201.

The electro-optical material layer reflects first circularly polarized light having a wavelength of a predetermined range and transmitting second circularly polarized light having a phase difference with the first circularly polarized light. The electro-optical material layer may include blue-phase liquid crystal layer 103.

The first polarization part 30 faces a rear face of the array substrate 101 and converts incident light of the rear face into the first circularly polarized light. The second polarization part 50 faces a front face, that is, an image displaying face, of the opposite substrate 201. The second polarization part 50 blocks the first circularly polarized light reflected from the electro-optical material layer after entering the front face and transmits the second circularly polarized light through the electro-optical material layer.

Figure 2:
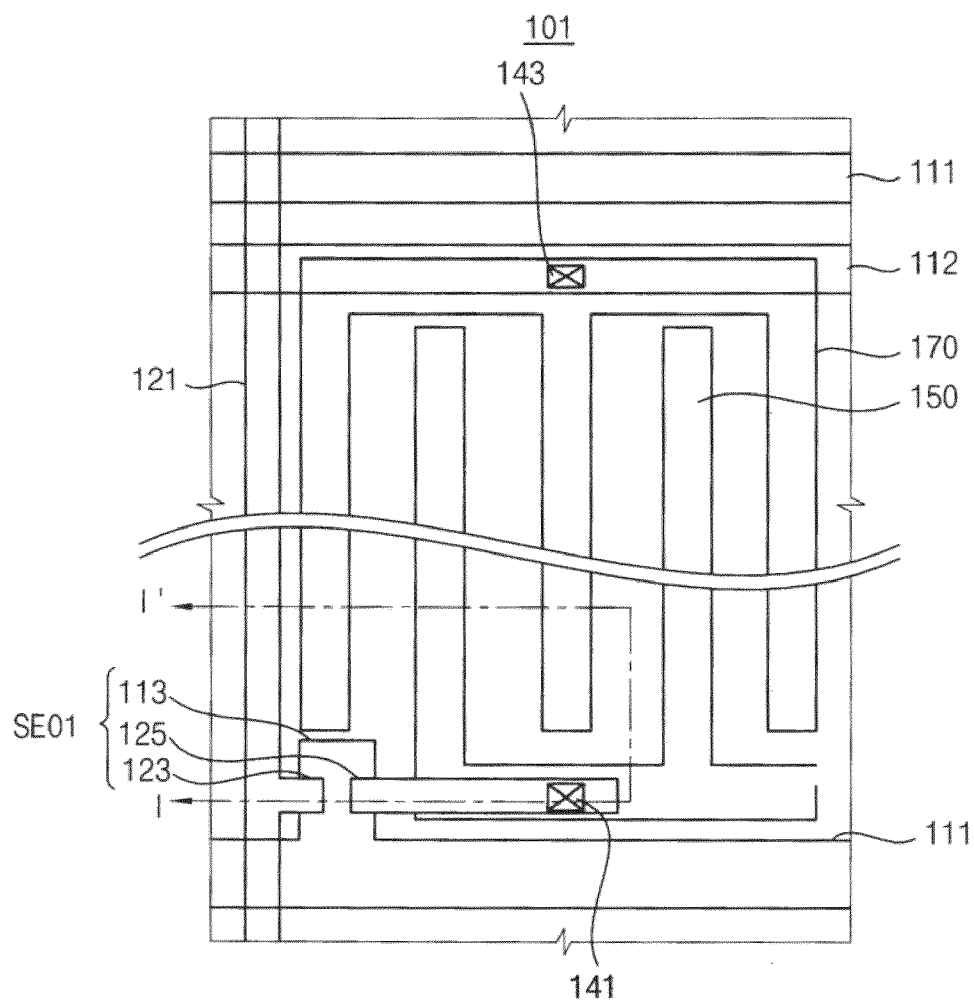
FIG. 2 is a plan view illustrating a pixel of the display panel of FIG. 1.
Figure 3:
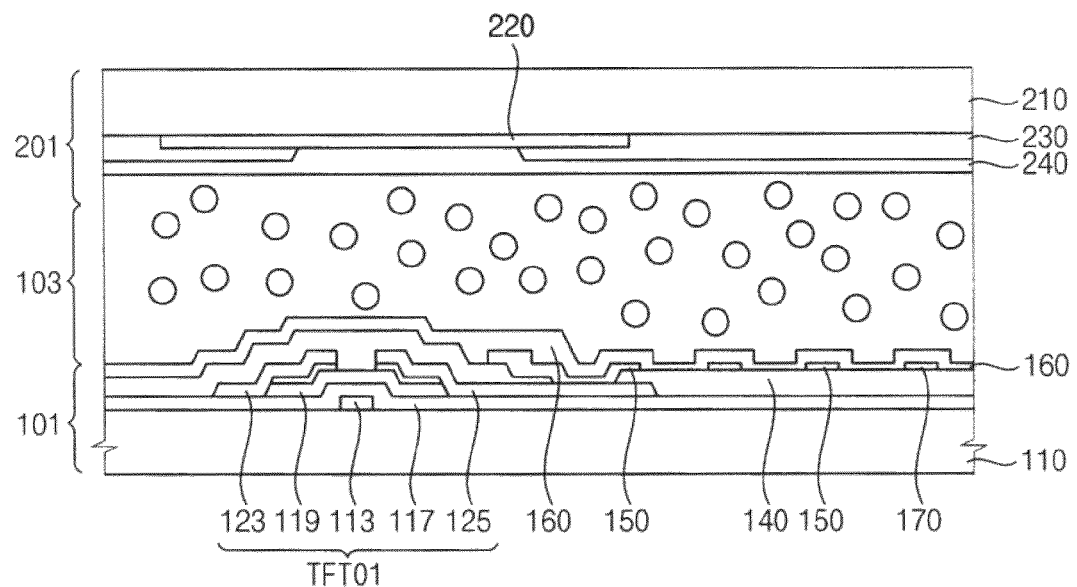
FIG. 3 is a cross-sectional view taken along a line IT of the display panel of FIG. 2.

FIG. 2 is a plan view illustrating a pixel of the display panel 10 in FIG. 1 and FIG. 3 is a cross-sectional view taken along a line I-I' of the display panel 10 in FIG. 2.

Referring to FIGS. 2 and 3, the array substrate 101 may include a lower substrate 110, a signal line, a gate insulation film 117, a switching element SE01, a passivation film 140, a pixel electrode 150, a common electrode 170 and a protective layer 160. The signal line may include a gate line 111, a common electrode line 112 and a data line 121.

On the lower substrate 110 formed with glass or plastic is formed a plurality of gate lines 111, a gate electrode 113 and a common electrode line 112 extended in a first direction. The gate insulation film 117 is formed with an insulation material such as a silicon nitride or a silicon oxide and others on the gate lines 111 and the common electrode line 112. A channel layer 119 having a patterned impurity amorphous oxide layer and an intrinsic amorphous oxide layer is formed on the insulation film 117 corresponding to the gate electrode 113.

A plurality of data lines 121 extended in a second direction orthogonal to the first direction, a source electrode 123 from the data line 121 and a drain electrode 125 are formed by forming a conduction film and patterning on the gate insulation film 117.

The switching element SE01 is formed by the processes described above. The switching element SE01 may include the gate electrode 113, the channel layer 119, source electrode 123 and the drain electrode 125. When a gate control signal is applied to the gate electrode 113 through the gate line 111, a data signal applied to the source electrode 123 through the data line 121 is applied to the drain electrode 125.

The passivation film 140 is formed on the lower substrate 110. An organic insulation film may be further formed on the passivation film 140. A contact hole 141 partially exposing the drain electrode 125 is formed in the passivation film 140.

The pixel electrode 150 and the common electrode 170 are formed with a transparent conduction material such as indium tin oxide (ITO) or indium zinc oxide (IZO) on the passivation film in a unit pixel area. The pixel electrode 150 and the common electrode 170 are respectively connected to the drain electrode 125 and the common electrode line 112 through the contact hole 141.

The pixel electrode 150 includes a plurality of first branches extended in the second direction in the unit pixel area. The common electrode 170 includes a plurality of second branches extended in the second direction and disposed between the first branches of the pixel electrode 150.

Figure 4A:
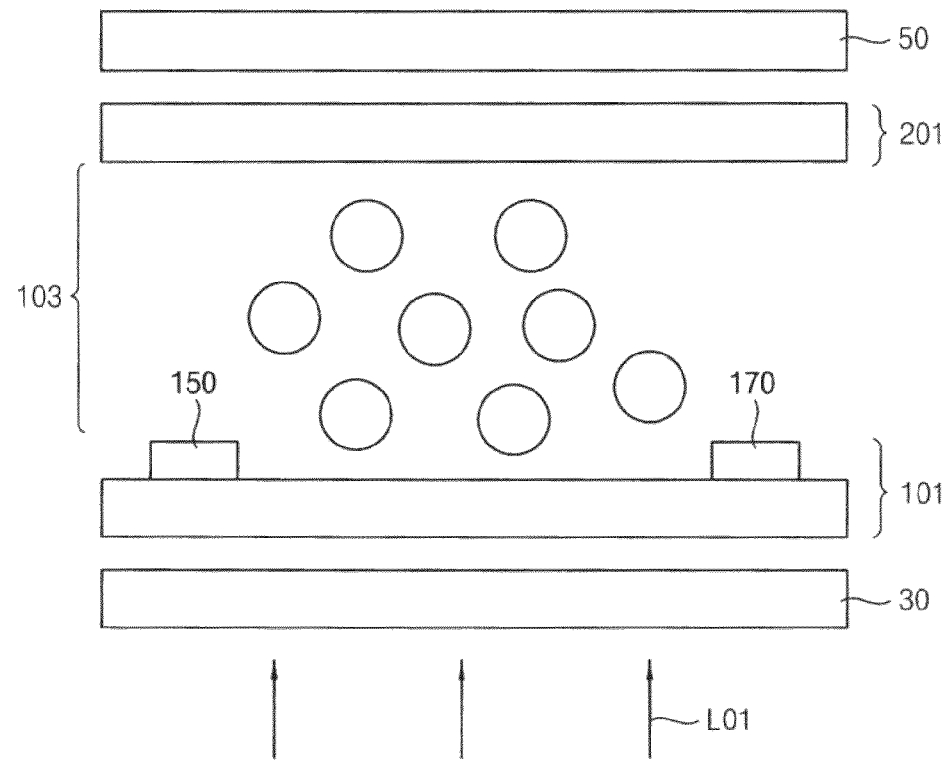
FIG. 4A is a simplified cross-sectional view illustrating the pixel of FIG. 3 when an electric field is in an off state.
Figure 4B:
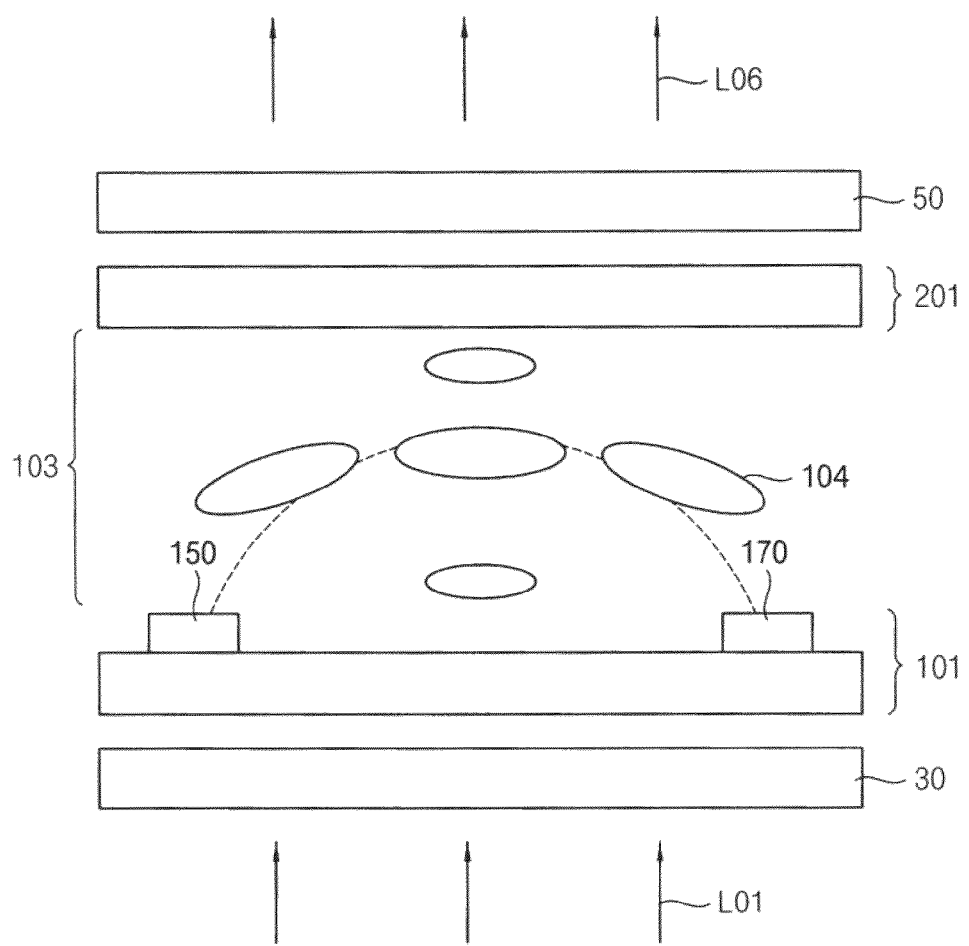
FIG. 4B is a cross-sectional view illustrating the pixel of FIG. 3 when the electric field is in an on state.

FIG. 4A is a simplified cross-sectional view illustrating the pixel of FIG. 3 when an electric field is in an off state, and FIG. 4B is a cross-sectional view illustrating the pixel of FIG. 3 when the electric field is in an on state.

Referring to FIGS. 4A and 4B, a blue-phase lattice structure is optical isotropy when in the off state in which the electric field is not applied to the blue-phase liquid crystal layer 103, and the blue-phase lattice structure is optical anisotropy when in the on state in which the electric field is applied to the blue-phase liquid crystal layer 103. When in the off state, a black state is displayed because light is not transmitted through the display apparatus 5 as illustrated in FIG. 4A. When in the on state, a white state is displayed because light is transmitted through the display apparatus 5 as illustrated in FIG. 4B.

A horizontal electric field is formed between the first branches of the pixel electrode 150 and the second branches of the common electrode 170, as illustrated in FIG. 4B. Forming the horizontal electric field between the pixel electrode 150 and the common electrode 170 is desirable for efficiently driving the blue-phase liquid crystal layer 103. For example, the display panel 10 according an example embodiment of the present invention may be driven by an in-plane switching (IPS) method.

Referring back to FIG. 3, the protective layer 160 may be formed on the pixel electrode 150 and the common electrode 170. The protective layer 160 physically and chemically protects the pixel electrode 150 and the common electrode 170. The alignment film may not be formed. The protective layer 160 does not perform an alignment function of the blue-phase liquid crystal layer 103, and the protective layer 160 may be formed on the pixel electrode 150 and the common electrode 170 by spreading the protective layer 160 on the pixel electrode 150 and the common electrode 170. That is, according to the present invention, an alignment film is not required because of characteristics of the blue-phase liquid crystal layer 103 described later. Therefore, a process for forming the alignment film may be omitted, and thus the number of manufacturing processes may be decreased.

The opposite substrate 201 may include an upper substrate 210, a light-blocking part 220, a color filter 230, and an overcoating layer 240.

The upper substrate 210 faces the lower substrate 110, and the upper substrate 210 is formed with the same material of the lower substrate 110. That is, the upper substrate 210 is formed with glass or plastic. The light-blocking part 220 is formed on the upper substrate correspondingly to the switching element SE01, the gate line 111, the common electrode line 112, and the data line 121. The light-blocking part 220 may be formed with a metal material having an organic material or chromium. The width of the light-blocking part 220 is wider than the width of the gate line 111 and the width of the data line 121, and the light-blocking part 220 covers boundary region of the unit pixel areas. The color filter 230 is formed on the upper substrate 210 divided by the light-blocking part 220. The color filter 230 may be one of a red color filter, a blue color filter, and a green color filter. The overcoating layer 240 is formed on the color filter 230 and the light-blocking part 220 to level the opposite substrate 201. As described above, the alignment film is not formed on the overcoating layer 240 because of the characteristics of the blue-phase liquid crystal layer 103.

Figure 5A:
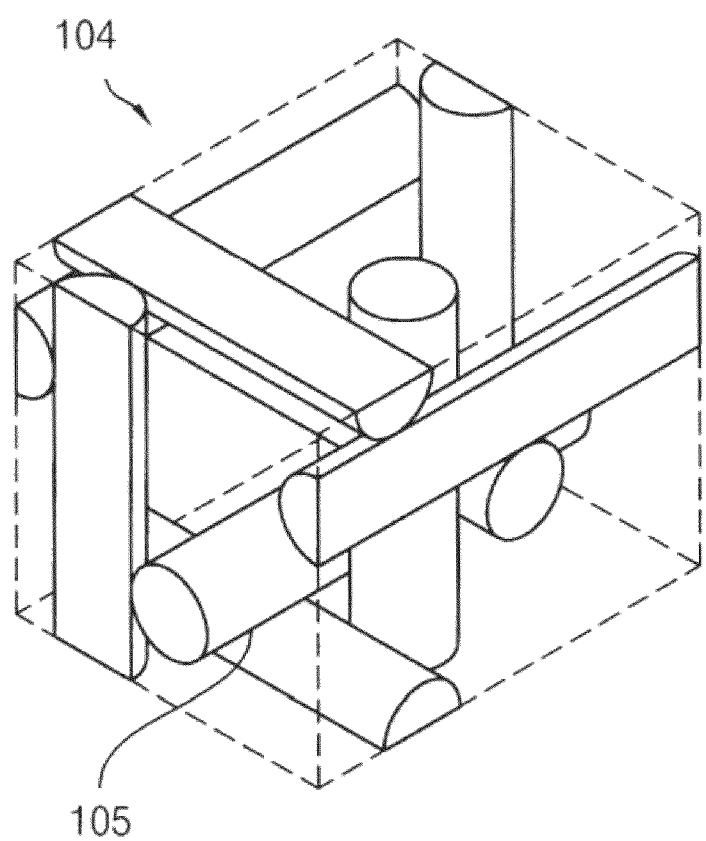
FIG. 5A is a perspective view illustrating a blue-phase lattice structure forming the blue-phase liquid crystal layer.
Figure 5B:
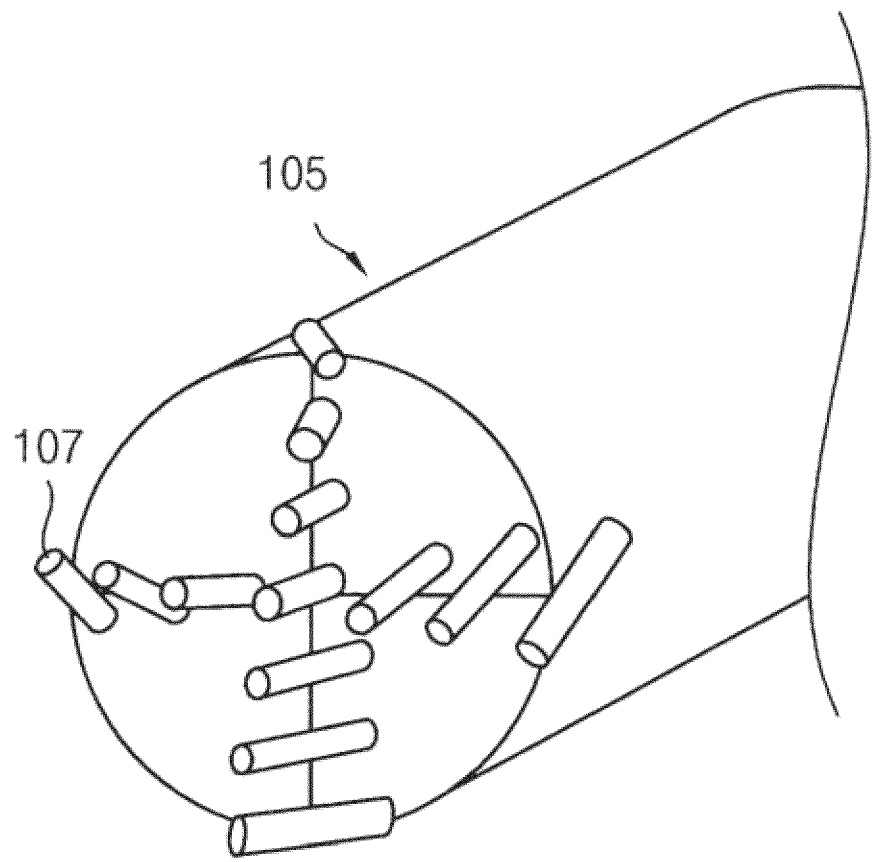
FIG. 5B is a perspective view illustrating a double helical cylinder forming the blue-phase lattice structure of FIG. 5A and blue-phase liquid crystal forming the double helical cylinder.
Figure 6A:
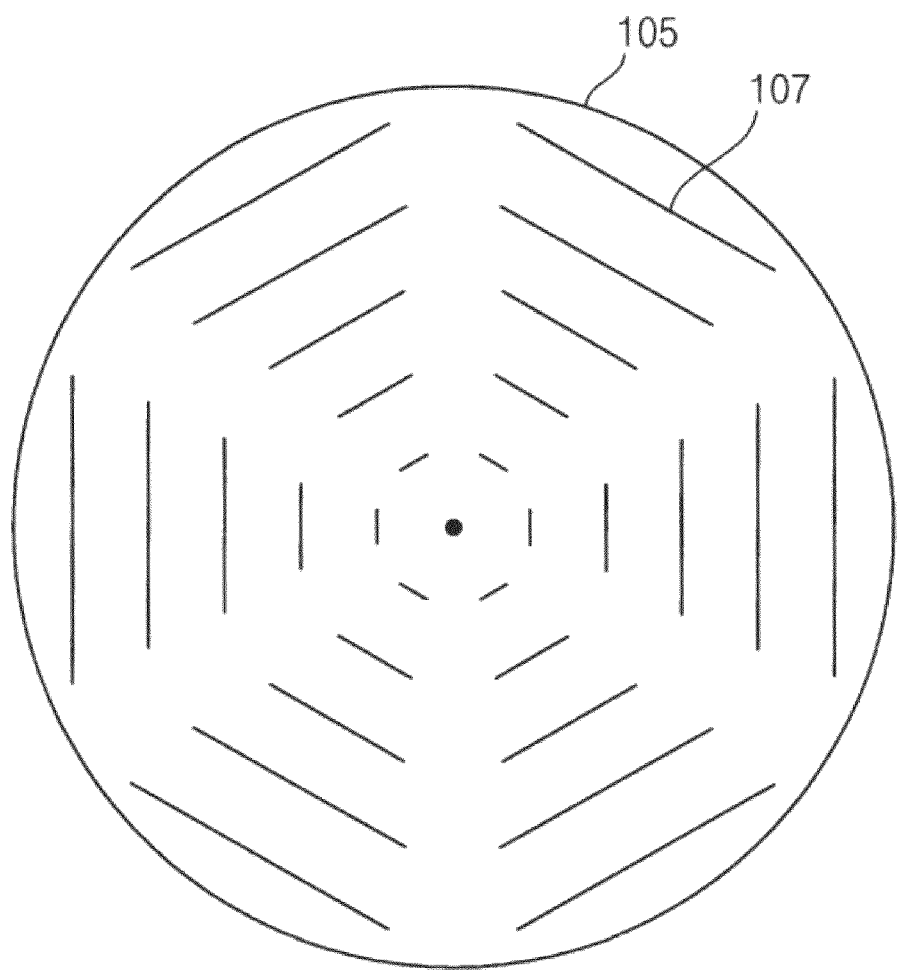
FIG. 6A is a plan view illustrating a section of the double helical cylinder.
Figure 6B:
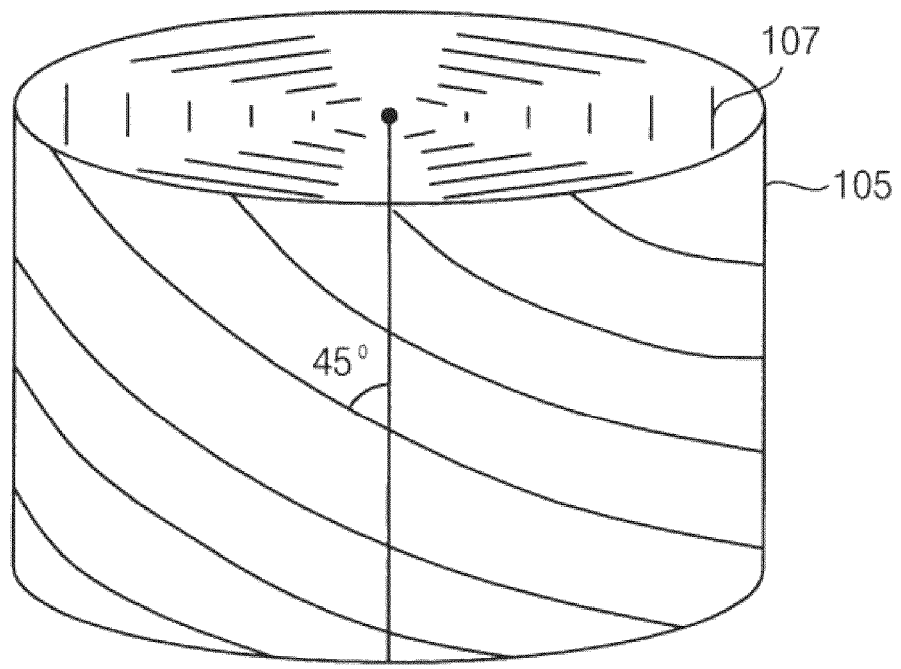
FIG. 6B is a perspective view illustrating a helical shape of the double helical cylinder.

FIG. 5A is a perspective view illustrating a blue-phase lattice structure 104 forming the blue-phase liquid crystal layer 103. FIG. 5B is a perspective view illustrating a double helical cylinder 105 forming the blue-phase lattice structure of FIG. 5A and blue-phase liquid crystal 107 forming the double helical cylinder 105. FIG. 6A is a plan view illustrating a section of the double helical cylinder 105. FIG. 6B is a perspective view illustrating a helical shape of the double helical cylinder 105.

Referring to FIGS. 5A and 5B, the blue-phase lattice structure 104 may be a simple-cubic structure. The blue-phase lattice structure 104 is optically isotropic when in the off state. In FIG. 4A, the blue-phase lattice structure 104 is illustrated as a circle for illustrating optical isotropy of the blue-phase lattice structure 104. When a voltage is applied to the blue-phase liquid crystal layer 103, the blue-phase lattice structure 104 is varied by the Kerr effect and a birefringence is formed. Therefore, the blue-phase lattice structure 104 is optically non-isotropic when in the on state. In FIG. 4B, the blue-phase lattice structure 104 is illustrated as an ellipse for illustrating optical anisotropy of the blue-phase lattice structure 104.

The blue-phase lattice structure 104 has the lattice structure as described above, and the blue-phase lattice structure 104 is optically isotropic or optically non-isotropic in accordance with an appliance of the voltage, and thus the display apparatus 5 including the blue-phase lattice structure 104 has a fast response time, a wide viewing angle, and advantages that a liquid crystal alignment film and a phase compensation film are not required.

The blue-phase lattice structure 104 includes a high polymer for phase stability of the blue-phase lattice structure 104. The phase stability of the blue-phase lattice structure 104 may be enhanced by hardening the high molecule by ultraviolet rays. A state of the blue-phase lattice structure 104 at a temperature of about 0 degrees to about 50 degrees, that is, a state of the blue-phase lattice structure 104 having enhanced phase stability is called a polymer-stabilized blue-phase (PSPB).

When an electric field is not applied to the blue-phase liquid crystal layer 103, the blue-phase lattice structure 104 is optically isotropic, and thus the blue-phase liquid crystal layer 103 may display a black state in which light is not transmitted through under an orthogonal polarizer. In accordance with the appliance of the electric field to the blue-phase liquid crystal layer 103, the birefringence is inducted to the blue-phase liquid crystal layer 103 by the Kerr effect, and thus the blue-phase lattice structure 104 is optically non-isotropic and the blue-phase liquid crystal layer 103 may display a white state.

In the black state, the blue-phase lattice structure 104 may respond to a specific band of a wavelength, and for example, the specific band may be blue light of about 400 nm through 450 nm having a peak about 420 nm. When the blue light of the wavelength band is incident to the blue-phase lattice structure 104, a blue circularly polarized light having a direction equal to a direction of a chirality of the blue-phase lattice structure 104 is reflected from the blue-phase lattice structure 104. A remainder of the blue light is circularly polarized in a direction opposite to a direction of the chirality, and the remainder of the blue light is transmitted through the blue-phase lattice structure 104. In the black state, the blue-phase lattice structure 104 is optically isotropic, and thus light except for the blue light having the wavelength band is transmitted through the blue-phase lattice structure 104 and a polarized direction the light except for the blue light is maintained. A selective reflection action related to the blue light of the blue-phase lattice structure 104 described above is defined as Bragg reflection.

In the white state, an effect of the Bragg reflection of the blue-phase lattice structure 104 is decreased, and the wavelength of reflected light in the white state is shorter than the wavelength of reflected light in the black state. In the white state, incident light is polarized by optical anisotropy of the blue-phase lattice structure 104. For example, circularly polarized light may be polarized as elliptically polarized light by the blue-phase lattice structure 104.

The blue-phase liquid crystal 107 forming the double helical cylinder of the blue-phase lattice structure 104 includes a texture twisted into a helical shape as illustrate in FIG. 5B, FIG. 6A and FIG. 6B. For example, the blue-phase liquid crystal 107 may be a compound of a nematic host and a chiral dope. A chirality of the chiral dope determines a chirality of the blue-phase liquid crystal 107, and thus the chirality of the chiral dope determines a chirality of the chirality of the blue-phase lattice structure 104. For example, the blue-phase liquid crystal 107 may be classified as a left-handed chirality blue-phase liquid crystal 107 and a right-handed chirality blue-phase liquid crystal 107, based on a twisted direction of the texture. The blue-phase liquid crystal layer 103 may include one of the left-handed chirality blue-phase liquid crystal 107 and the right-handed chirality blue-phase liquid crystal 107.

Figure 7:
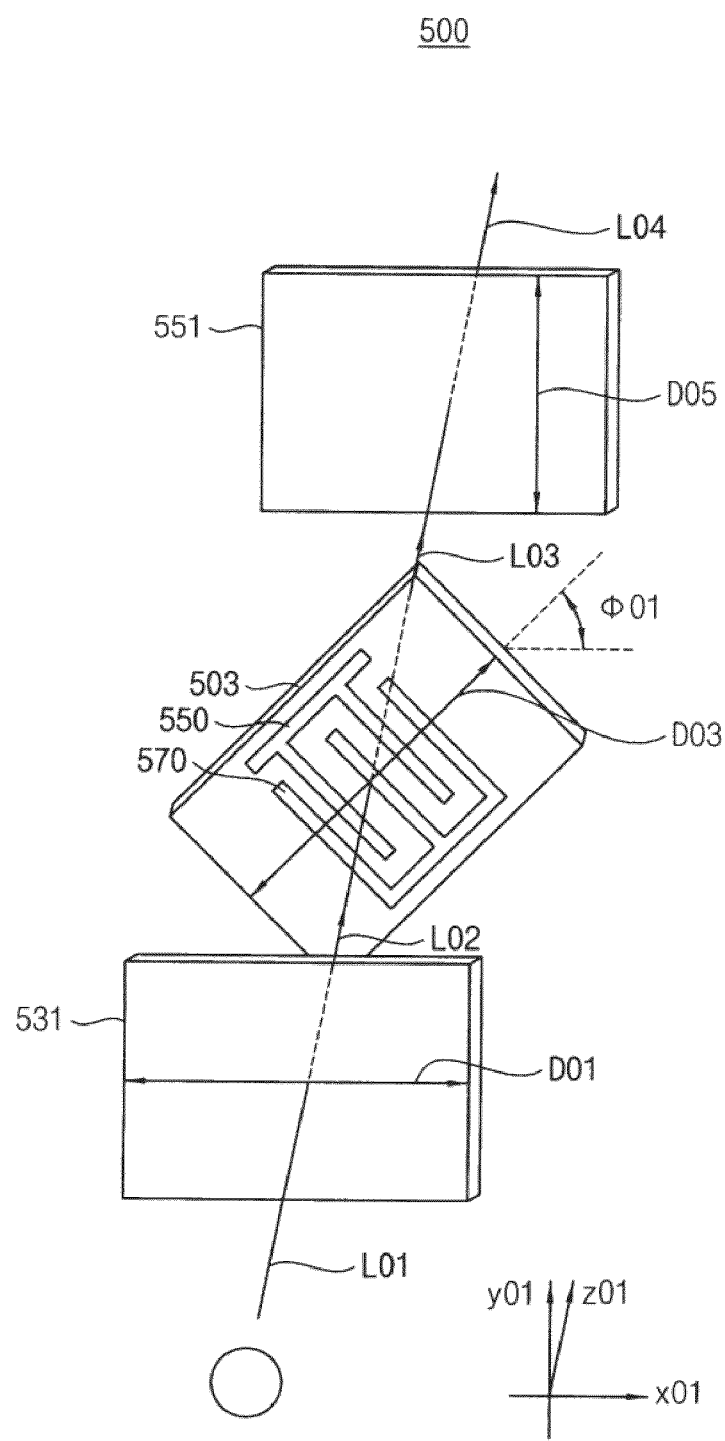
FIG. 7 is an exploded perspective view illustrating an orthogonal polarizer display apparatus.

FIG. 7 is an exploded perspective view illustrating an orthogonal polarizer display apparatus 500.

Referring to FIG. 7, in the orthogonal polarizer display apparatus 500, a first linear polarization plate 531 having a first polarization axis is disposed at a rear face of blue-phase liquid crystal layer 503, a second linear polarization plate 551 having a second polarization axis orthogonal to the first linear polarization axis is disposed at a front face of the blue-phase liquid crystal layer 503. First light L01 such as a backlight L01 is a non-polarized light, and the first light L01 is linearly polarized and converted into second light L02. The second light L02 is transmitted through the blue-phase lattice structure 104 and the second light L02 converted into third light L03. In the black state, the third light L03 is blocked by the second linear polarization plate 551 because a polarization direction of the third light L03 is maintained substantially equal to a polarization direction of the second light L02.

In the white state, the third light L03 has a polarization direction different from the polarization direction of the second light L02. A portion of the third light L03 is transmitted through the second linear polarization plate 551 and the portion of the third light L03 is converted into fourth light L04.

As described above, the pixel electrode 150 and the common electrode 170 are disposed in-plane type, and thus the birefringence of the blue-phase lattice structure 104 is inducted horizontally with a plane of the first linear polarization plate 531 and a plane of second linear polarization plate 551. When an angle formed by a direction of the inducted birefringence and the first polarization axis is defined as a birefringence angle ($\phi$), a transmission ratio of the blue-phase lattice structure 104 is determined as following equation $T=\sin^2(2\phi)\sin^2(\Gamma/2)$. In the above equation $\Gamma=2\pi\Delta nd/\lambda$, $\Delta n$ denotes the inducted birefringence by the electric field, d denotes the width of the blue-phase lattice structure 104 and $\lambda$ denotes the wavelength of the second light L02.

Figure 8:
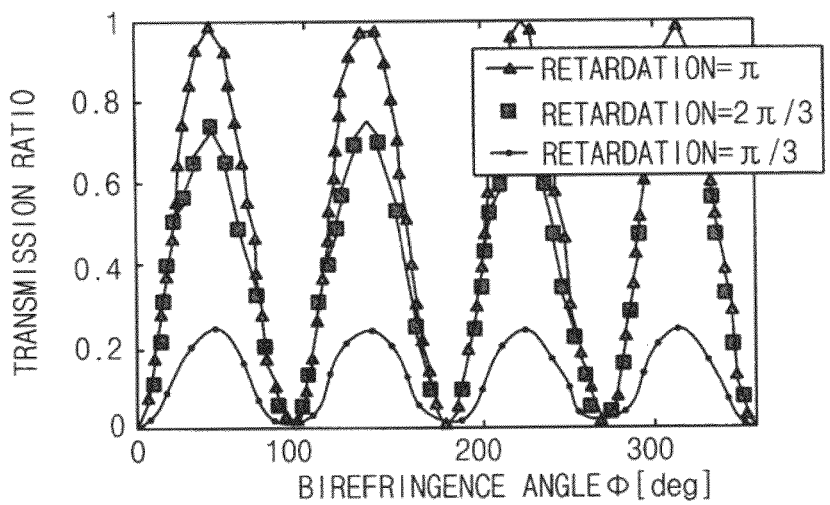
FIG. 8 is a graph illustrating a transmission ratio in accordance with the birefringence angle of the blue-phase liquid crystal layer of FIG. 7.
Figure 9:
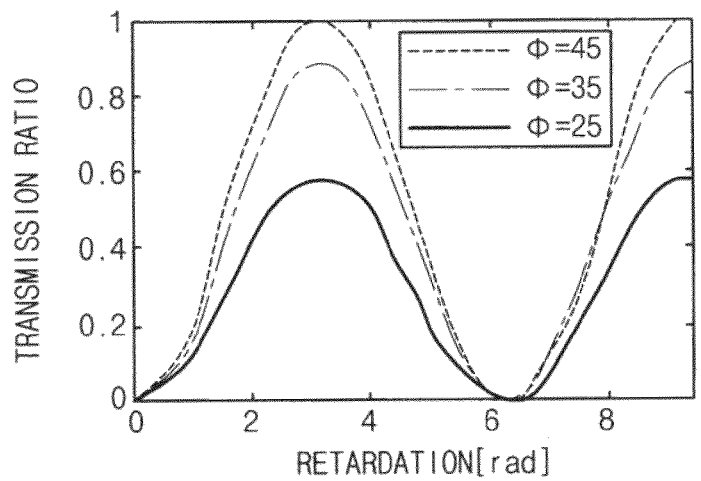
FIG. 9 is a graph illustrating a transmission ratio in accordance with a retardation of the blue-phase liquid crystal layer of FIG. 7.

FIG. 8 is a graph illustrating a transmission ratio in accordance with the birefringence angle of the blue-phase liquid crystal layer 503 in FIG. 7. FIG. 9 is a graph illustrating a transmission ratio in accordance with a retardation of the blue-phase liquid crystal layer 503 in FIG. 7.

In FIG. 8, a horizontal axis denotes the birefringence angle and a vertical axis denotes the transmission ratio. In FIG. 9, a horizontal axis denotes the retardation demonstrated as $\Delta nd$ and a vertical axis denotes the transmission ratio. As illustrated in FIGS. 8 and 9, the transmission ratio depends on the angle formed by the birefringence and the first polarization axis. An angle formed by a direction of a horizontal electric field which is a direction of the inducted birefringence and the first polarization axis is preferably about 45 degrees so as to generate a maximum luminance However, an error may be generated in a manufacturing process of the display apparatus 500, and the number of processes may be additionally increased due to an alignment process of an induction direction of the birefringence.

Figure 10:
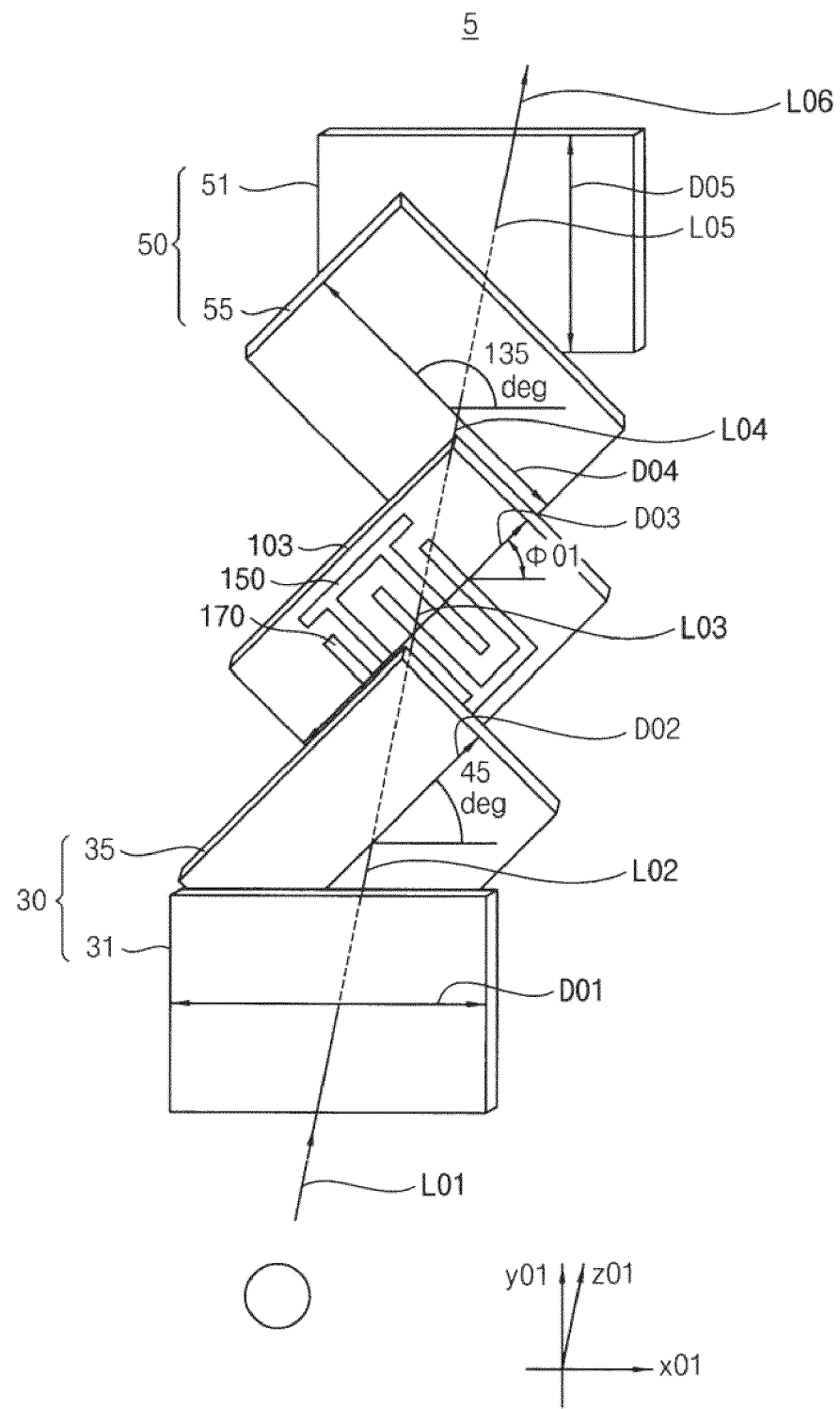
FIG. 10 is an exploded perspective view illustrating the display apparatus described in FIG. 1 through FIG. 5.
Figure 11:
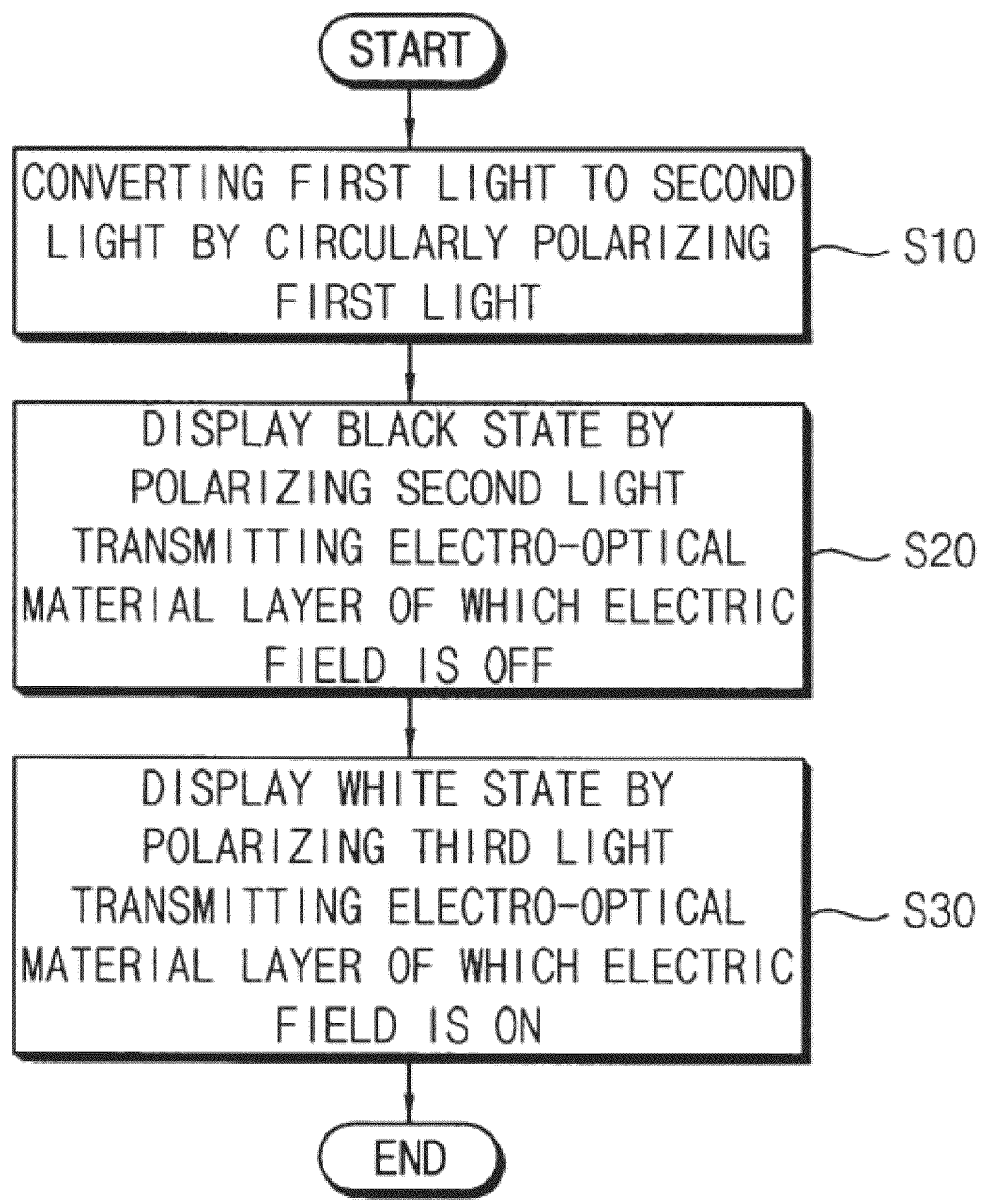
FIG. 11 is a flowchart illustrating a method of displaying an image according to an example embodiment of the present invention.

FIG. 10 is an exploded perspective view illustrating the display apparatus 5 described in FIG. 1 through FIG. 5. FIG. 11 is a flowchart illustrating a method of displaying an image according to an example embodiment of the present invention.

Referring to FIG. 10, in the display apparatus 5, the first polarization part 30 is disposed at a rear face of the blue-phase lattice structure 104 and the second polarization part 50 is disposed at a front face of the blue-phase lattice structure 104. The method of displaying an image according to an example embodiment of the present invention will be described with reference to FIGS. 10 and 11.

First, first light L01 is circularly polarized and the first light L01 is converted into second light L03 (STEP S10). For example, the first polarization part 30 may includes a first linear polarization plate 31 and a first $\lambda/4$ polarization plate 35. The first linear polarization plate 31 linearly polarizes the first light L01 which is a randomly polarized light and incident light of the rear face to convert the first light L01 into linearly polarized light L02. The first $\lambda/4$ polarization plate 35 is disposed between the array substrate 101 and the first linear polarization plate 31. A phase of the linearly polarized light L02 is varied as $\lambda/4$ by the first $\lambda/4$ polarization plate 35 and the linearly polarized light L02 is converted into the second light L03 which is circularly polarized light.

The second polarization part 50 may include a second linear polarization plate 51 and a second λ/4 polarization plate 55 disposed at the front face of the blue-phase lattice structure 104. The second λ/4 polarization plate 55 is disposed between the blue-phase lattice structure 104 and the second linear polarization plate 51. A polarization axis of the first linear polarization plate 31 is orthogonal to a polarization axis of the second linear polarization plate 51. A phase difference of the first λ/4 polarization plate 35 and the second λ/4 polarization plate 55 is about 90 degrees.

The second light L03 transmitted through the blue-phase lattice structure 104 of which the electric field is off is orthogonally polarized based on a polarization direction of the first light L01 and the black state is displayed (STEP S20). As described above, the blue-phase lattice structure 104 is optically isotropic when the electric field is in an off state. Therefore, the second light L03 maintains a polarization state of the second light L03 and is transmitted through the blue-phase lattice structure 104. A phase of the second light L03 is varied as λ/4 by the second λ/4 polarization plate 55; however, the second light L03 is blocked by the second linear polarization plate 51. Therefore, the black state is displayed.

Third light L04 formed by the second light L03 transmitted through the blue-phase liquid crystal layer 103 having the optical anisotropy by the appliance of the electric field is orthogonally polarized and the white state is displayed (STEP S30). The second light L03 which is incident light of the blue-phase lattice structure 104 that the electric field is applied is elliptically polarized and the third light L04 is formed. A phase of the third light L04 is varied as λ/4 by the second λ/4 polarization plate 55, and the third light L04 is converted into fourth light L05. The fourth light L05 is transmitted through the second linear polarization plate 51. Therefore, the white state is displayed.

In the example embodiment, the first polarization part 30 operates as a circular polarizer of incident light of the first linear polarization plate 31. The second polarization part 50 operates as a circular polarizer of incident light of the second linear polarization plate 51.

Figure 12:
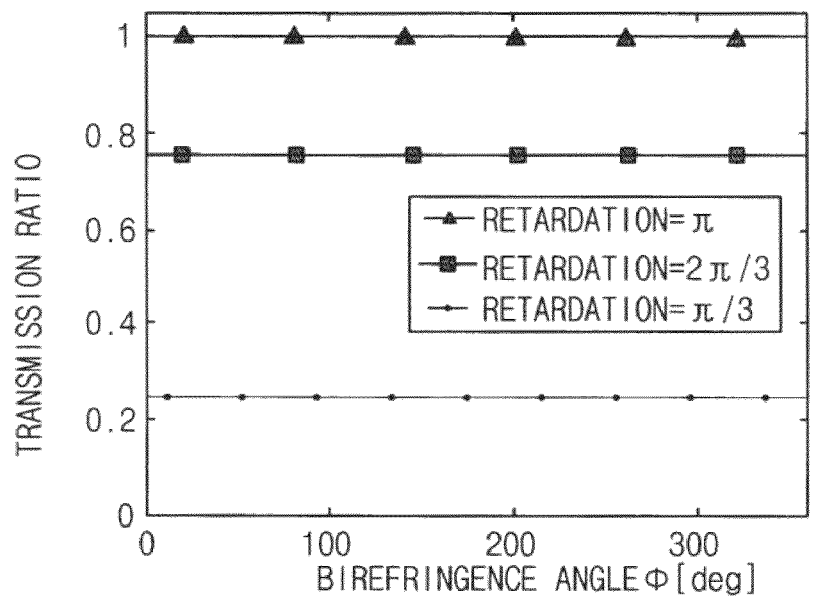
FIG. 12 is a graph illustrating a transmission ratio in accordance with the birefringence angle of the blue-phase liquid crystal layer of FIG. 10.
Figure 13:
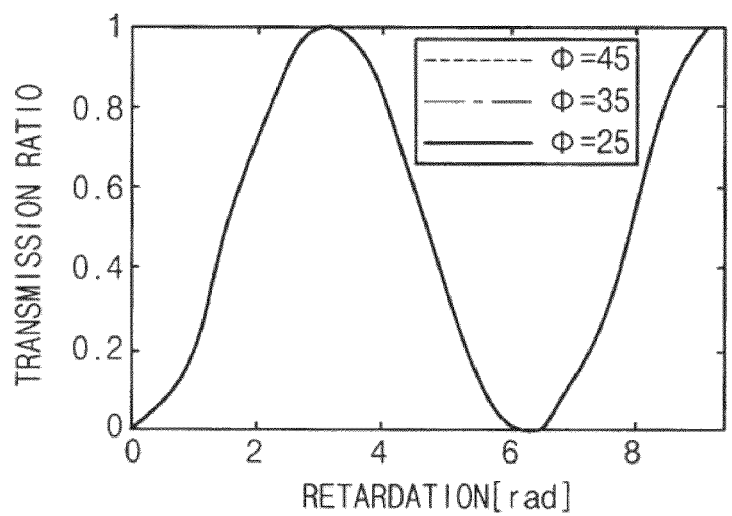
FIG. 13 is a graph illustrating a transmission ratio in accordance with a retardation of the blue-phase liquid crystal layer of FIG. 10.

FIG. 12 is a graph illustrating a transmission ratio in accordance with the birefringence angle of the blue-phase liquid crystal layer 103 in FIG. 10. FIG. 13 is a graph illustrating a transmission ratio in accordance with a retardation of the blue-phase liquid crystal layer 103 in FIG. 10.

In FIG. 12, a horizontal axis denotes the birefringence angle and a vertical axis denotes the transmission ratio. In FIG. 13, a horizontal axis denotes the retardation demonstrated as Δnd and a vertical axis denotes the transmission ratio. As illustrated in FIGS. 12 and 13, the transmission ratio does not depend on the angle formed by the birefringence and the first polarization axis when the circular polarizer is used. Therefore, an angle formed by a direction of a horizontal electric field which is a direction of the induced birefringence and the first polarization axis is not required to have about 45 degrees so as to generate a maximum luminance, and the angle formed by the direction of the horizontal electric field and the first polarization axis may be a random angle. Therefore, in a manufacturing process of the display apparatus 5, a maximum transmission ratio may be obtained irrelevantly to an error occurrence, the direction of the induced birefringence may be freely designed, and thus the process may be more convenient.

Figure 14:
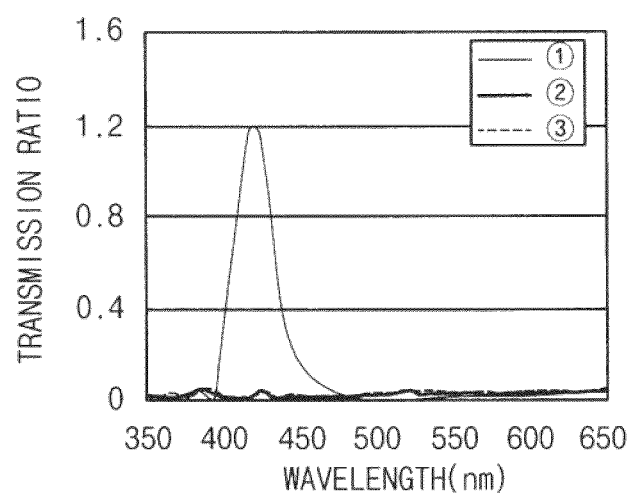
FIG. 14 is a graph illustrating a backlight transmitted through the blue-phase lattice structure 104 under an orthogonal polarizer or a circular polarizer.
Figure 15A:
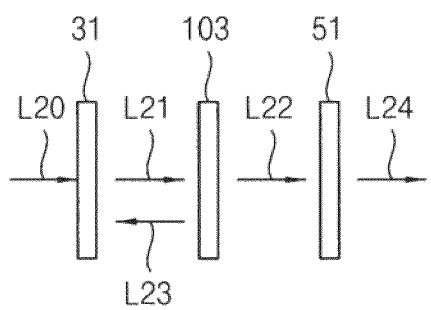
FIG. 15A is a diagram illustrating optical characteristics of a backlight of the blue-phase liquid crystal layer when the orthogonal polarizer is used.

FIG. 14 is a graph illustrating a backlight transmitted through the blue-phase lattice structure 104 under an orthogonal polarizer or a circular polarizer. FIG. 15A is a diagram illustrating optical characteristics of a backlight of the blue-phase liquid crystal layer 103 when the orthogonal polarizer is used.

Referring to FIG. 15A, the backlight is provided from a light source such as a lamp or a light emitting diode, and the backlight is randomly polarized light. The backlight is linearly polarized by the first linear polarization plate 31, a portion of blue light in the backlight is reflected in a black state, and a remaining portion of the backlight is transmitted through the blue-phase lattice structure 104 that forms the blue-phase liquid crystal layer 103. An element of most of the remaining portion transmitting through the blue-phase lattice structure 104 maintains a polarization state polarized by the first linear polarization plate 31. Therefore, the element of the remaining portion transmitting through the blue-phase lattice structure 104 is blocked. In the remaining portion transmitting through the blue-phase lattice structure 104, blue light circularly polarized by the Bragg reflection may exist. The circularly polarized blue light is transmitted through the second linear polarization plate 51. Therefore, weak blue light of about 1.2% transmission ratio is measured as indicated by (1) in FIG. 14.

Figure 15B:
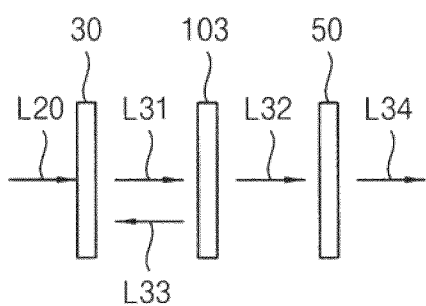
FIG. 15B is a diagram illustrating optical characteristics of a backlight of the blue-phase liquid crystal layer when a left-handed circular polarizer—blue-phase liquid crystal layer—right-handed circular polarizer structure is used.

FIG. 15B is a diagram illustrating optical characteristics of a backlight of the blue-phase liquid crystal layer when a left-handed circular polarizer—blue-phase liquid crystal layer—right-handed circular polarizer structure is used.

Referring to FIG. 15B, the backlight is left-handed circularly polarized and the backlight is converted into second light. In the example embodiment, the blue-phase lattice structure 104 may have a left-handed chirality. Therefore, most of blue light is reflected right-handed circularly polarized light is rarely outputted from the blue-phase lattice structure 104. Light except for the blue light maintains a polarization state of the second light in a black state and is transmitted through the blue-phase lattice structure 104 to be third light. When the second polarization part 50 is a right-handed circular polarizer, the third light transmitted through the blue-phase lattice structure 104 rarely is transmitted through the second polarization part 50 as indicated by (2) in FIG. 14.

Figure 15C:
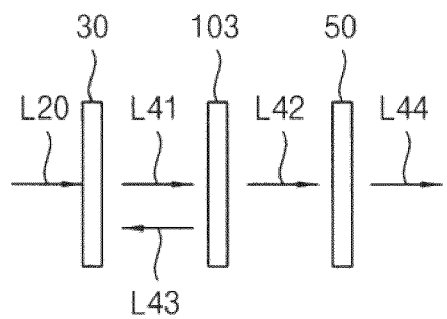
FIG. 15C is a diagram illustrating optical characteristics of a backlight of the blue-phase liquid crystal layer when a right-handed circular polarizer—blue-phase liquid crystal layer—left-handed circular polarizer structure is used.

FIG. 15C is a diagram illustrating optical characteristics of a backlight of the blue-phase liquid crystal layer when a right-handed circular polarizer—blue-phase liquid crystal layer—left-handed circular polarizer structure is used.

Referring to FIG. 15C, the backlight is right-handed circularly polarized and the backlight is converted into second light. The blue-phase lattice structure 104 may have a left-handed chirality. Therefore, most of the second light is transmitted and becomes third light. The third light maintains a polarization state of the second light in a black state. When the second polarization part 50 is a left-handed circular polarizer, the third light is not transmitted through the second polarization part 50 as indicated by (3) in FIG. 14.

Disposition methods of the circular polarizer in the display apparatus 5 illustrated in FIGS. 15B and 15C have similar contrast ratio in displaying a black state and a white state.

Figure 16:
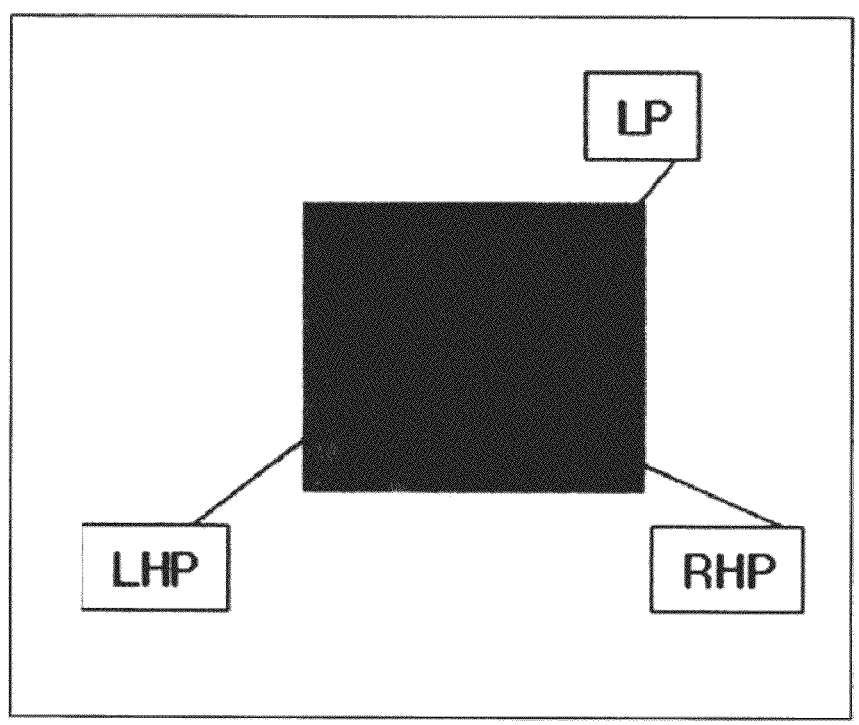
FIG. 16 is images illustrating a front face of the display panel in a black state when an orthogonal polarizer and a circular polarizer are used.
Figure 17A:
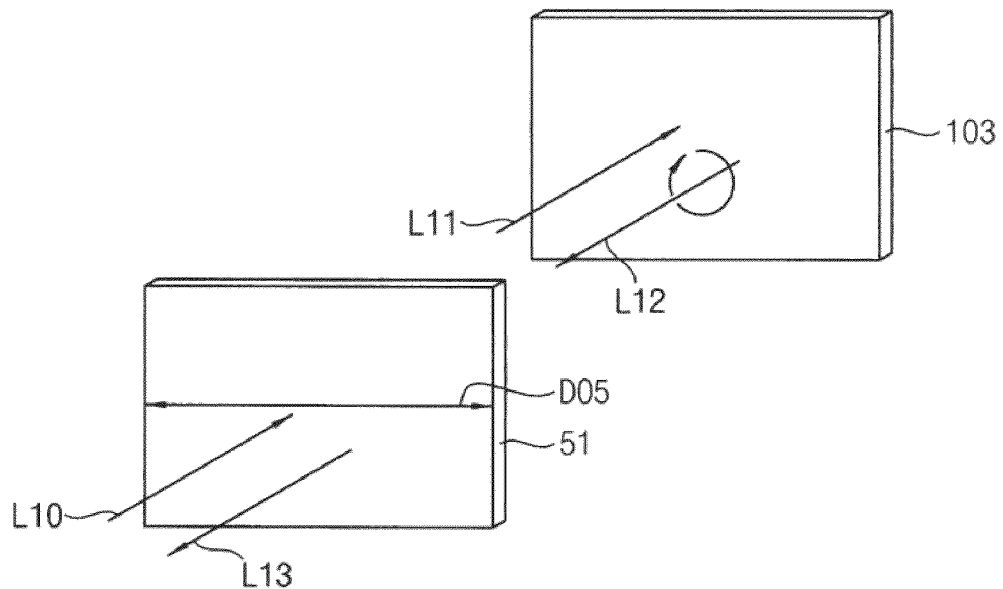
FIG. 17A is a perspective view illustrating reflection characteristics of external light of the blue-phase liquid crystal layer when the orthogonal polarizer is used.

FIG. 16 is images illustrating a front face of the display panel 10 in a black state when an orthogonal polarizer and a circular polarizer are used. FIG. 17A is a perspective view illustrating reflection characteristics of external light of the blue-phase liquid crystal layer 103 when the orthogonal polarizer is used.

In FIG. 17A, when the second linear polarization plate 51 is disposed at the front face of the blue-phase lattice structure 104, external light which is a non-polarized light is linearly polarized by the second linear polarization plate 51 and the external light is converted into second light. A portion of the second light reflects from the blue-phase lattice structure 104 by the Bragg reflection and becomes reflected light. As described above, the blue-phase lattice structure 104 reflects light having a specific wavelength band. In the black state, the blue-phase lattice structure 104 reflects blue light. The reflected light is circularly polarized light, and thus the reflected light is not totally blocked by the second linear polarization plate 51 and weak blue light may be transmitted through the second linear polarization plate 51 as represented by LP in FIG. 16. Therefore, in the black state, the luminance of the display panel 10 may be increased and a contrast ratio may be decreased by the external light.

Figure 17B:
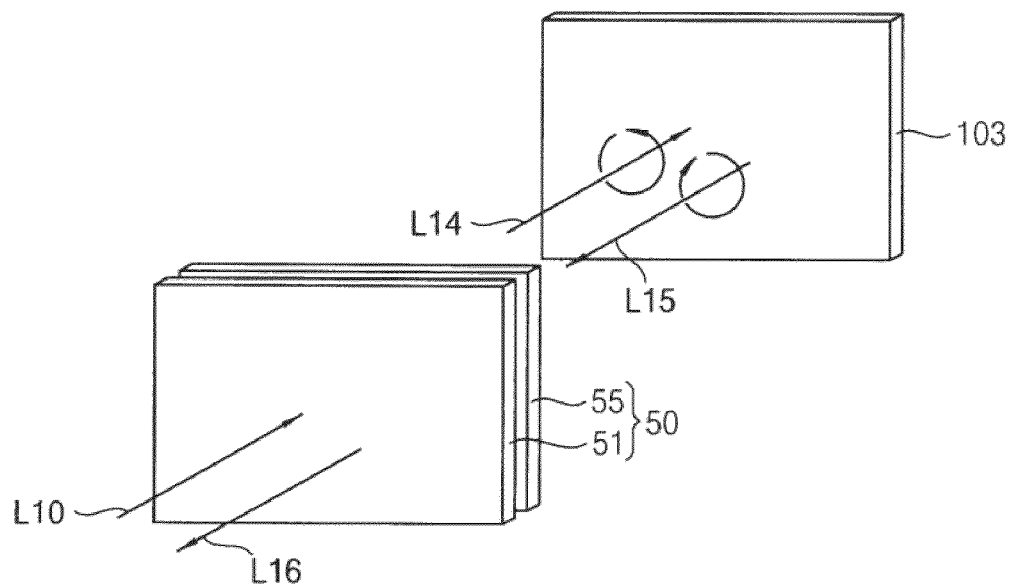
FIG. 17B is a perspective view illustrating reflection characteristics of external light of the blue-phase liquid crystal layer when a left-handed circular polarizer is used.

FIG. 17B is a perspective view illustrating reflection characteristics of external light of the blue-phase liquid crystal layer 103 when a left-handed circular polarizer is used.

In FIG. 17B, the second polarization part 50 is a left-handed circular polarizer and the blue-phase lattice structure 104 includes left-handed chirality liquid crystal reflecting left-handed circularly polarized light. The external light is linearly polarized by the second linear polarization plate 51, the external light is left-handed circularly polarized by the second λ/4 polarization plate 55 and the external light is converted into second light. Therefore, most of the second light is reflected by the blue-phase lattice structure 104 and most of the second light becomes reflected light. The reflected light is left-handed circularly polarized light, and thus a strong blue light may be outputted by transmitted through the second polarization part 50, as illustrated by LHP in FIG. 16. Therefore, the contrast ratio of the display panel 10 may be decreased by the external light.

Figure 17C:
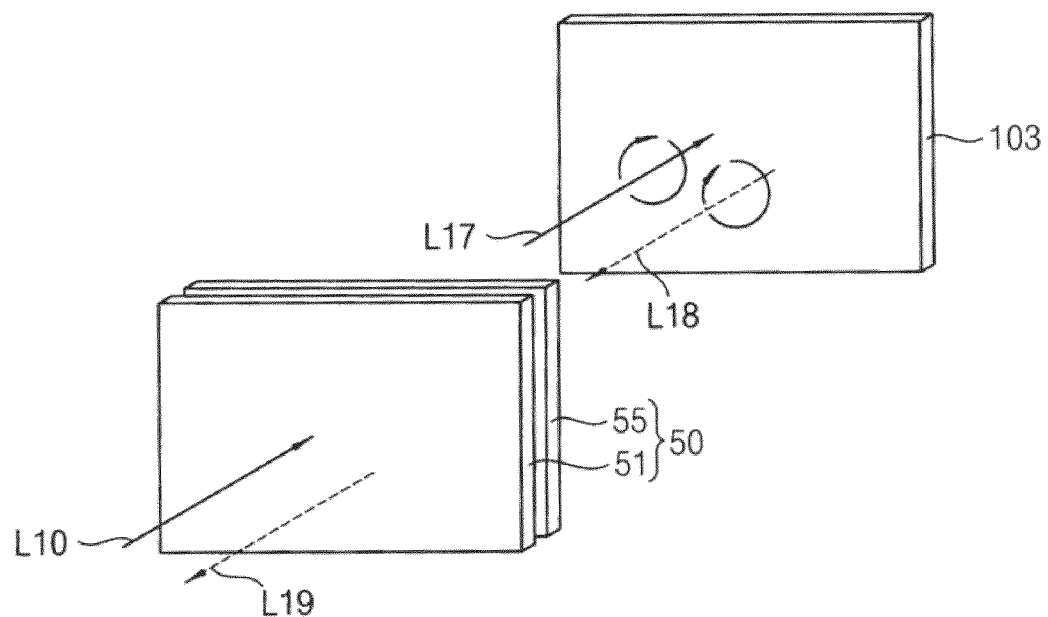
FIG. 17C is a perspective view illustrating reflection characteristics of external light of the blue-phase liquid crystal layer when a right-handed circular polarizer is used.

FIG. 17C is a perspective view illustrating reflection characteristics of external light of the blue-phase liquid crystal layer 103 when a right-handed circular polarizer is used. In FIG. 17C, the second polarization part 50 is a right-handed circular polarizer and the blue-phase lattice structure 104 includes left-handed chirality liquid crystal reflecting left-handed circularly polarized light. The external light is linearly polarized by the second linear polarization plate 51, the external light is right-handed circularly polarized by the second λ/4 polarization plate 55 and the external light is converted into second light. Therefore, most of the second light is transmitted through the blue-phase lattice structure 104. A polarization efficiency of the second polarization part 50 may not be about 100%, and thus a portion of the light transmitted through the blue-phase lattice structure 104 may have a left-handed circularly polarized element. The feeble left-handed circularly polarized light is reflected by the blue-phase lattice structure 104 and the feeble left-handed circularly polarized light becomes reflected light left-handed circularly polarized. The second polarization part 50 is a right-handed circular polarizer, and thus the reflected light is blocked by the second polarization part 50. Therefore, the reflected light is hardly transmitted through the second polarization part 50 as illustrated by RHP in FIG. 16, and thus the contrast ratio of the display panel may be increased. Therefore, in increasing the contrast ratio, cases illustrated in FIGS. 17C and 15B are better than cases illustrated in FIG. 17B and FIG. 15C.

With reference to FIG. 17B and FIG. 17C, cases in which the blue-phase lattice structure 104 has the left-handed chirality are described. In contrast, when the blue-phase lattice structure 104 having a right-handed chirality is adopted, the second polarization part 50 may be a left-handed circular polarizer to increase the contrast ratio, by a principle described above with reference to FIG. 17B and FIG. 17C.

Figure 18A:
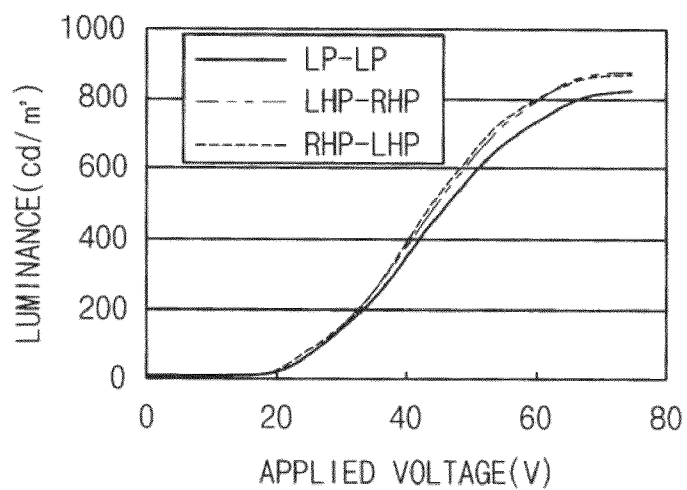
FIG. 18A is a graph illustrating a luminance in accordance with a voltage applied to the blue-phase liquid crystal layer.
Figure 18B:
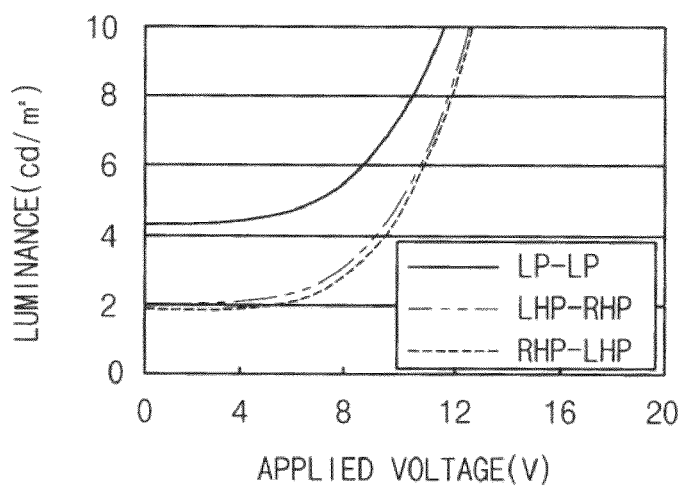
FIG. 18B is an enlarged graph illustrating an initial state in FIG. 18A.

FIG. 18A is a graph illustrating a luminance in accordance with a voltage applied to the blue-phase liquid crystal layer 103. FIG. 18B is an enlarged graph illustrating an initial state in FIG. 18A.

In FIGS. 18A and 18B, a graph illustrated as LP-LP corresponds to a case the orthogonal polarizer is used, as described with reference to FIGS. 15A and 17A. In FIGS. 18A and 18B, a graph illustrated as LHP-RHP corresponds to a case the left-handed circular polarizer and the right-handed circular polarizer are used, as described with reference to FIGS. 15B and 17C. In FIGS. 18A and 18B, a graph illustrated as RHP-LHP corresponds to a case the right-handed circular polarizer and the left-handed circular polarizer are used, as described with reference to FIGS. 15C and 17B.

In FIGS. 18A and 18B, a voltage applied to a pixel having the in-plane electrode structure is denoted in a horizontal axis and the luminance of an output light is denoted in a vertical axis. In all of two cases in which the circular polarizer is used, a maximum luminance, which is the luminance of a white state, is increased than a case that the orthogonal polarizer is used. The luminance of the black state which is a luminance in case of the voltage being not applied to the pixel is decreased in all of the two cases in which the circular polarizer is used than the case that the orthogonal polarizer is used. Therefore, the contrast ratio may be increased about two times in all of the two cases in which the circular polarizer is used than the case that the orthogonal polarizer is used.

Figure 19A:
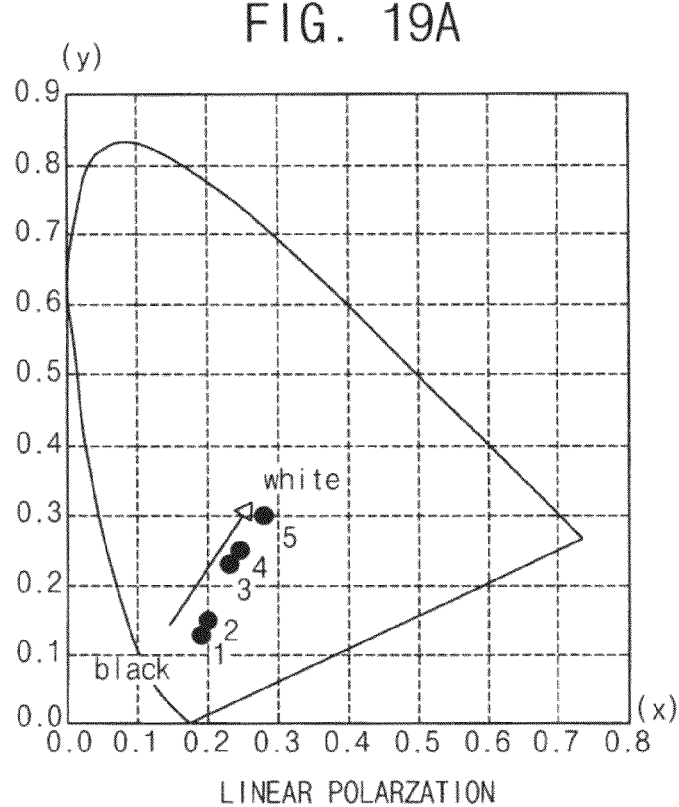
FIG. 19A is a graph illustrating color coordinates in accordance with a grayscale display of the blue-phase liquid crystal layer when the orthogonal polarizer is used.
Figure 19B:
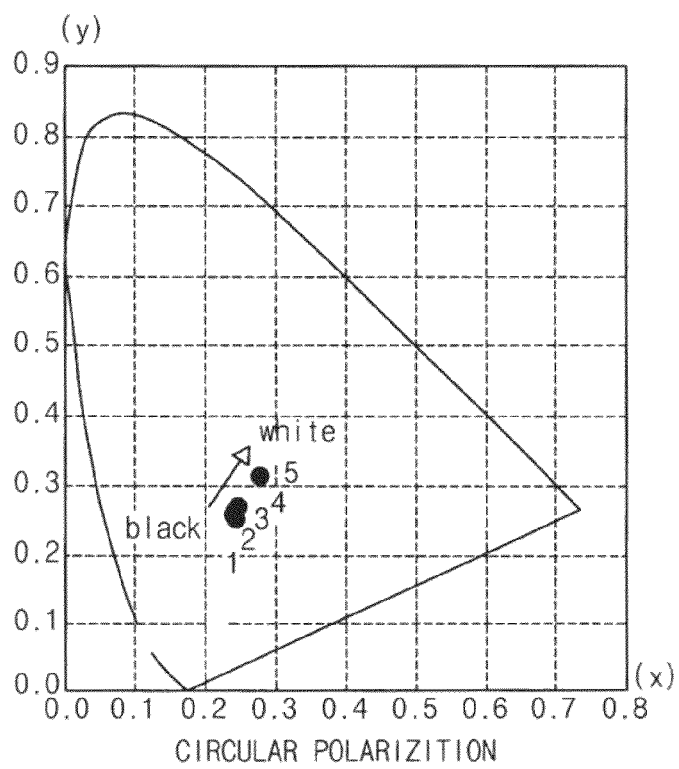
FIG. 19B is a graph illustrating color coordinates in accordance with a grayscale display of the blue-phase liquid crystal layer when the circular polarizer is used.

FIG. 19A is a graph illustrating color coordinates in accordance with a grayscale display of the blue-phase liquid crystal layer 103 when the orthogonal polarizer is used. FIG. 19B is a graph illustrating color coordinates in accordance with a grayscale display of the blue-phase liquid crystal layer 103 when the circular polarizer is used. In a shape similar to a triangular shape of FIG. 19A and FIG. 19B, an upper top side corresponds to a green light area, a lower right side corresponds to a red light area and a lower left side corresponds to a blue light area.

When a grayscale is varied from a low grayscale to a high grayscale, for example, from the black state to the white state, a variation degree of the grayscale is illustrated as Nos. 1, 2, 3, 4 and 5. In a case of the black state illustrated as No. 1, a blue shift is occurred in a black screen when the orthogonal polarizer is used, as illustrated in FIG. 19A, and thus a contrast ratio is decreased. The blue shift is decreased when the circular polarizer is used, and thus the contrast ratio may be increased. In a case of the white state illustrated as No. 5, selective reflection characteristics of the blue-phase lattice structure 104 rarely have an effect on a color shift. Therefore, color reproduction in accordance with the grayscale display may be increased according to some example embodiments of the present invention.

According to the present invention, a manufacturing process is simplified, a contrast ratio may be increased by preventing a bluish phenomenon of blue-phase liquid crystal and display quality may be enhanced by increasing color reappearance in accordance with a grayscale. Therefore, the method of displaying an image and the display apparatus for performing the method may be widely embodied to a liquid crystal display apparatus.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures.

Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A method of displaying an image, the method comprising:
   converting first light into second light by circularly polarizing the first light;
   displaying a black state by orthogonally polarizing the second light with respect to a first direction in which the first light is polarized, the second light passing an electro-optical material layer having a chirality in which circularly polarized light having a wavelength of a predetermined range is reflected and having optical isotropy when an electric field is off; and
   displaying a white state by orthogonally polarizing third light with respect to the first direction, the third light being formed by passing the second light through the electro-optical material layer having optical anisotropy when an electric field is applied to the electro-optical material layer.

2. The method of claim 1, wherein the electro-optical material layer comprises blue-phase liquid crystal displaying the black state when the electric field is not applied thereto to be the optical isotropy, and displaying the white state when the electric field is applied thereto to induce the optical anisotropy having birefringence characteristics.

3. The method of claim 2, wherein the first light is left-handed circularly polarized to be converted into the second light, the blue-phase liquid crystal comprises a left-handed liquid crystal reflecting a portion of the second light, and a remainder of the second light transmitted through the blue-phase liquid crystal is right-handed circularly polarized in the black state so that the second light is blocked.

4. The method of claim 3, wherein converting into the second light comprises:
   linearly polarizing the first light that is a non-polarized light; and
   left-handed circularly polarizing the linearly polarized first light by varying a phase of the linearly polarized first light by $\lambda/4$.

5. The method of claim 4, wherein displaying the white state comprises:
   varying a phase of the third light by $\lambda/4$ to polarize the third light, the third light being formed by passing the second light through the blue-phase liquid crystal receiving the electric field, the second light being left-handed circularly polarized light; and
   orthogonally polarizing the third light having the varied phase based on a linear polarized direction of the first light and outputting the orthogonally polarized third light.

6. The method of claim 2, wherein displaying the black state comprises:
   circularly polarizing fourth light in an opposite direction of a polarizing direction of the second light to convert into fifth light, the fourth light incident into the electro-optical material layer in an opposite direction of the second light; and
   orthogonally polarizing a reflected light of the fifth light with respect to the first light polarized direction to block the reflected light, the reflected light being generated by reflecting the fifth light to the electro-optical material layer.

7. The method of claim 2, wherein the first light is right-handed circularly polarized and converted into the second light, the blue-phase liquid crystal comprises a right-handed liquid crystal reflecting a portion of the second light, and a remainder of the second light transmitted through the blue-phase liquid crystal is left-handed circularly polarized and blocked in the black state.

8. The method of claim 7, wherein converting into the second light comprises:
   linearly polarizing the first light, the first light being a non-polarized light; and
   right-handed circularly polarizing the linearly polarized first light by varying a phase of the linearly polarized first light by $\lambda/4$.

9. The method of claim 8, wherein displaying the white state comprises:
   varying a phase of the third light by $\lambda/4$ to polarize the third light, the third light being formed by passing the second light through the blue-phase liquid crystal receiving the electric field, the second light being right-handed circularly polarized light; and
   orthogonally polarizing the third light having the varied phase based on a linear polarized direction of the first light and outputting the orthogonally polarized third light.

10. The method of claim 2, wherein a horizontal electric field is applied to the blue-phase liquid crystal an in-plane switching (IPS) method.

11. The method of claim 2, further comprising:
   passing the third light to a color filter to generate a color before orthogonally polarizing the third light based on a polarized direction of the first light.

12. A display apparatus comprising:
   a display panel comprising an array substrate, an opposite substrate and an electro-optical material layer disposed between the array substrate and the opposite substrate, the array substrate and the opposite substrate facing each other, the electro-optical material layer reflecting first circularly polarized light having a wavelength of a predetermined range and transmitting second circularly polarized light having a phase difference with the first circularly polarized light, the first circularly polarized light and second circularly polarized light being incident light from the exterior;
   a first polarization part facing a rear face of the array substrate and converting incident light of the rear face into the first circularly polarized light; and
   a second polarization part facing a front face of the opposite substrate and blocking the first circularly polarized light reflected from the electro-optical material layer and transmitted through the second circularly polarized light transmitted through the electro-optical material layer.

13. The display apparatus of claim 12, wherein the electro-optical material layer uses blue-phase liquid crystal displaying the black state when the electric field is off by having optical isotropy and displaying the white state when the electric field is applied to the electro-optical material layer by being inducted optical anisotropy having birefringence characteristics.

14. The display apparatus of claim 13, wherein the second polarization part converts incident light of the front face into a third circularly polarized light having a polarization direction equal to a polarization direction of the second circularly polarized light.

15. The display apparatus of claim 13, wherein the blue-phase liquid crystal comprises:
   a nematic liquid crystal;
   a chiral dopant giving a chirality to the nematic liquid crystal; and
   a polymer strengthening phase stability of the blue-phase liquid crystal, the polymer being hardened by ultraviolet rays.

16. The display apparatus of claim 13, wherein the first polarization part comprises a first linear polarization plate linearly polarizing a non-polarized incident light of the rear face and a first λ/4 polarization plate disposed between the array substrate and the first linear polarization plate, and the second polarization part comprises a second linear polarization plate disposed orthogonally with the first linear polarization plate and a second λ/4 polarization plate disposed between the opposite substrate and the second linear polarization plate, a polarization axis of the second λ/4 polarization plate being orthogonal to the first λ/4 polarization plate.

17. The display apparatus of claim 16, wherein the first polarization part left-handed circularly polarizes incident light of the rear face, the blue-phase liquid crystal comprises left-handed chirality liquid crystal reflecting a portion of the left-handed circularly polarized light and the second polarization part linearly polarizes right-handed circularly polarized light transmitted through the blue-phase liquid crystal.

18. The display apparatus of claim 16, wherein the first polarization part right-handed circularly polarizes incident light of the rear face, the blue-phase liquid crystal comprises a right-handed chirality liquid crystal reflecting a portion of the right-handed circularly polarized light and the second polarization part linearly polarizes left-handed circularly polarized light transmitted through the blue-phase liquid crystal.

19. The display apparatus of claim 16, wherein the array substrate comprises:
   a lower substrate formed a signal line;
   a switching element electrically connected to the signal line;
   a pixel electrode electrically connected to a drain electrode of the switching element; and
   a common electrode forming a horizontal electric field with the pixel electrode by an IPS method, the common electrode formed adjacent to the pixel electrode.

20. The display apparatus of claim 19, wherein the opposite substrate comprises:
   an upper substrate facing the lower substrate;
   color filters formed on the upper substrate correspondingly to the pixel electrode; and
   a light-blocking part formed between the color filters to shield the signal line and the switching element.

* * * * *